J. B. EISEMAN.
DARNING EGG.
APPLICATION FILED MAR. 18, 1911.
1,068,420.
Patented July 29, 1913.
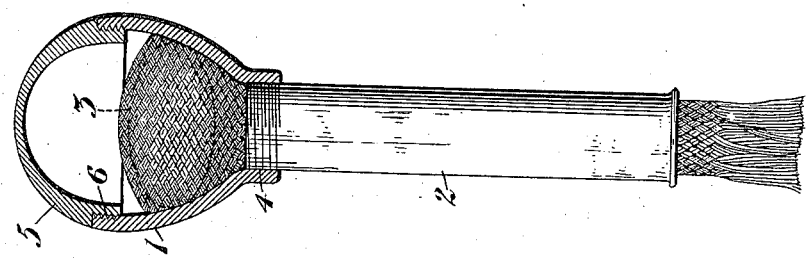
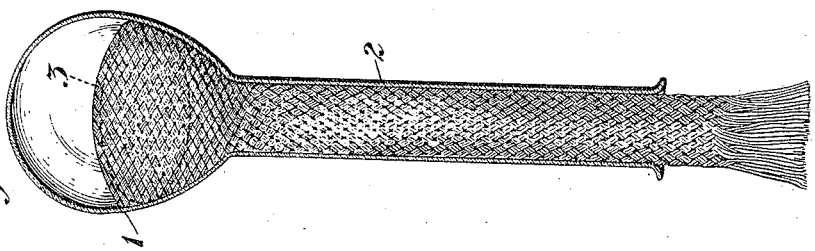

UNITED STATES PATENT OFFICE.

JESSE B. EISEMAN, OF NEW YORK, N. Y.

DARNING-EGG.

1,068,420.  Specification of Letters Patent.  Patented July 29, 1913.

Application filed March 18, 1911. Serial No. 615,411.

*To all whom it may concern:*

Be it known that I, JESSE B. EISEMAN, a citizen of the United States, residing at New York, in the county of New York and State of New York, have invented certain new and useful Improvements in Darning-Eggs; and I do hereby declare the following to be a full, clear, and exact description of the invention, such as will enable others skilled in the art to which it appertains to make and use the same.

The invention is a simple, inexpensive article which is very convenient to the user, because the yarn will always be inclosed in the darning egg and will thereby always be handy for use.

My invention consists of the combinations and features hereinafter fully described and claimed.

In the accompanying drawing, Figure 1 is a sectional view showing the article made entirely of glass. Fig. 2 is still another modification and shows the article as constructed partly of glass and some other material.

Similar reference characters refer to similar parts in the different views of the drawing.

In this article the egg 1 used for darning is made hollow and the handle 2 is made tubular so that the tubular opening leads directly to the hollow space in the egg. Where it is desired to use a skein, the same is bent over a core 3 about midway between the ends of the skein, as shown in Figs. 1 and 2, and said ends are passed through the tubular handle 2 as shown in the drawing, the middle of the skein which was bent over the core 3 being held within the egg, and the core 3 thus serving to retain the skein within the article in order that it should not fall through the handle 2. When using the darning egg thus provided with the skein, a single thread may be pulled out and used in darning with the egg in the ordinary manner.

In the modifications shown here, the darning egg may be made entirely of glass as in Fig. 1, in which case the ball or skein of yarn with the core 3 is placed within the egg 1 in any suitable manner, and passed through the tubular handle, so that the darning egg and yarn would be thus equipped for use and sold together. However, in the modification shown in Fig. 2 the handle 2 is made separately and screwed in place at 4, and the upper part of the egg is formed like a cover 5 which is also removable and screwed together at 6, so that the user may purchase either a ball or skein of yarn, place the same within the egg and pass the yarn through the handle 2 as described above and shown in Fig. 2. Fig. 2 shows the handle made of glass which is more convenient, its transparency being very desirable.

It must be understood that my invention is not to be limited to the specific form of construction and arrangement as shown and described here. For example, instead of egg formed, the head may be shaped like a shoe-last or any other convenient form that can be adapted for drawing the stocking over the same when the device is being used, and other variations may be made in practice without however departing from the spirit of my invention.

Having thus described my invention, I claim:—

1. In a container for darning yarn, an enlarged and hollow egg shaped body, a tubular handle extending therefrom to receive a braid of yarn passing therethrough and into said hollow body and a retainer in said hollow body portion to prevent accidental removal of said braid.

2. In a container for darning yarn, an enlarged and hollow egg shaped body having an elongated hollow tubular handle integral therewith, said body and handle being adapted to contain a braid of darning yarn bent upon itself and a retainer in the hollow body portion.

In testimony whereof I affix my signature in presence of two witnesses.

JESSE B. EISEMAN.

Witnesses:
MARY PERRY,
HUGO MOCK.

Copies of this patent may be obtained for five cents each, by addressing the "Commissioner of Patents, Washington, D. C."